US012753863B2

(12) United States Patent
Huang et al.

(10) Patent No.: US 12,753,863 B2
(45) Date of Patent: Oct. 6, 2026

(54) BRAIDED FLEXIBLE PIPE ASSEMBLY

(71) Applicant: TAIZHOU KLOE DAFENG PLUMBING CO., LTD., Taizhou City (CN)

(72) Inventors: Youchun Huang, Taizhou City (CN); Weijie Huang, Taizhou City (CN)

(73) Assignee: TAIZHOU KLOE DAFENG PLUMBING CO., LTD., Taizhou City (CN)

( * ) Notice: Subject to any disclaimer, the term of this patent is extended or adjusted under 35 U.S.C. 154(b) by 24 days.

(21) Appl. No.: 19/006,929

(22) Filed: Dec. 31, 2024

(65) Prior Publication Data

US 2026/0117899 A1 Apr. 30, 2026

(30) Foreign Application Priority Data

Oct. 28, 2024 (CN) ......................... 202411513768.9

(51) Int. Cl.
*F16K 15/06* (2006.01)
*F16L 11/10* (2006.01)
*F16L 11/12* (2006.01)

(52) U.S. Cl.
CPC .......... *F16L 11/122* (2013.01); *F16K 15/066* (2013.01); *F16L 11/10* (2013.01); *Y10T 137/7842* (2015.04); *Y10T 137/7846* (2015.04)

(58) Field of Classification Search
CPC ......... Y10T 137/7842; Y10T 137/7846; F16K 15/066
See application file for complete search history.

(56) References Cited

U.S. PATENT DOCUMENTS

| | | | | |
|---|---|---|---|---|
| 1,245,873 A * | 11/1917 | Cole | F16K 15/20 | 137/614.19 |
| 3,542,063 A * | 11/1970 | Etter | F16K 1/30 | 137/329.06 |
| 5,004,009 A * | 4/1991 | Bunce | B65B 39/004 | 137/512.5 |
| 6,173,734 B1 * | 1/2001 | Olivas | F16K 17/30 | 137/460 |
| 7,077,149 B2 * | 7/2006 | Kalley | F25B 45/00 | 137/563 |

FOREIGN PATENT DOCUMENTS

CN 104534126 A * 4/2015 ............. F16L 19/00

OTHER PUBLICATIONS

Machine translation of CN 104534126.*

* cited by examiner

*Primary Examiner* — Kevin F Murphy

(57) ABSTRACT

A braided flexible pipe assembly, including a braided flexible pipe, a water inlet connector connected to an end of the braided flexible pipe, and a water outlet connector connected to another end of the braided flexible pipe. A water inlet adjustment assembly is arranged in the water inlet connector, and a water outlet adjustment assembly is arranged in the water outlet connector; a pressure transmission pipe is connected between the water inlet adjustment assembly and the water outlet adjustment assembly, and the pressure transmission pipe is arranged in the braided flexible pipe; in condition of the water outlet connector being in a closed state, the water outlet adjustment assembly seals the water inlet adjustment assembly via the pressure transmission pipe, and the water inlet connector is caused to be in a closed state.

10 Claims, 4 Drawing Sheets

BRAIDED FLEXIBLE PIPE ASSEMBLY

CROSS REFERENCE TO RELATED APPLICATIONS

The present application claims the priority of Chinese patent application No. 202411513768.9, filed on Oct. 28, 2024, and the entire contents of which are hereby incorporated by reference in its entirety.

TECHNICAL FIELD

The present disclosure relates to the technical field of braided flexible pipes, and specifically to a braided flexible pipe assembly.

BACKGROUND

A braided flexible pipe is a pipe with a braided reinforcement. Generally speaking, a metal flexible pipe includes three main parts: a corrugated pipe, a mesh sleeve, and a connector. The corrugated pipe is the main body of the metal flexible pipe and acts as a flexible part; the mesh sleeve strengthens and shields the pipe; and the connector connects the pipe. The braided flexible pipe is widely used in the connection between the water supply and drainage.

The braided flexible pipe is mostly located inside walls or behind furniture, and water leakage problems are often not easy to detect, which may cause serious water damage and safety hazards. Especially when transporting some special liquids, if the pipe body ruptures and leaks and cannot be detected in time, safety accidents may occur.

To this end, the present disclosure provides a braided flexible pipe assembly, for mitigating the water leakage problems caused by aging and rupture of braided flexible pipes, so as to avoid the risk of water leakage from braided flexible pipes.

SUMMARY OF THE DISCLOSURE

The purpose of the present disclosure is to provide a braided flexible pipe assembly to avoid water leakage from the braided flexible pipe, as set forth in the above background technology.

In view of this, the present disclosure provides a braided flexible pipe assembly, including a braided flexible pipe, a water inlet connector connected to an end of the braided flexible pipe, and a water outlet connector connected to another end of the braided flexible pipe; wherein a water inlet adjustment assembly is arranged in the water inlet connector, and a water outlet adjustment assembly is arranged in the water outlet connector; a pressure transmission pipe is connected between the water inlet adjustment assembly and the water outlet adjustment assembly, and the pressure transmission pipe is arranged in the braided flexible pipe; in condition of the water outlet connector being in a closed state, the water outlet adjustment assembly seals the water inlet adjustment assembly via the pressure transmission pipe, and the water inlet connector is caused to be in a closed state.

In some embodiments, the water inlet adjustment assembly includes a first stopper, and a first piston is connected to an end of the first stopper towards inside the braided flexible pipe; the first piston is sealed and slidably connected within a first connecting pipe.

In some embodiments, the water outlet adjustment assembly includes a second stopper, and a second piston is connected to an end of the second stopper towards outside the braided flexible pipe; the second piston is sealed and slidably connected within a second connecting pipe.

In some embodiments, a first sealing-limiting ring body is fixedly arranged on an inner side of the water inlet connector, and the first sealing-limiting ring body is configured to limit the first stopper in a direction towards the water inlet connector outward; in condition of the first stopper completely abutting against the first sealing-limiting ring body, the closed state of the water inlet connector is achieved.

In some embodiments, a second sealing-limiting ring body is fixedly arranged on an inner side of the water outlet connector, and the second sealing-limiting ring body is configured to limit the second stopper in a direction towards the water outlet connector outward; in condition of the second stopper completely abutting against the second sealing-limiting ring body, the closed state of the water outlet connector is achieved.

In some embodiments, the first connecting pipe is sealed and connected to an end of the pressure transmission pipe, and the second connecting pipe is sealed and connected to another end of the pressure transmission pipe.

In some embodiments, a first elastic member is arranged in the first connecting pipe; the first elastic member is limited in the first connecting pipe, and the first elastic member is in a compressed state and presses against the first piston in a direction towards the first stopper.

In some embodiments, a limiting ring body is fixedly arranged in the water outlet connector, and a second elastic member is connected between the limiting ring body and an end of the second stopper in the direction towards a water outlet.

In some embodiments, the pressure transmission pipe is filled with a liquid; the liquid is configured to synchronize a movement of the second piston towards the water outlet through liquid pressure in condition of the first piston moving towards the water outlet; or, the liquid is configured to synchronize a movement of the first piston towards a water inlet through liquid pressure in condition of the second piston moving towards the water inlet.

In some embodiments, in condition of the first stopper and the second stopper moving simultaneously towards the water outlet, the water inlet connector and the water outlet connector are in an open state and water flow is allowed;

in condition of the first stopper and the second stopper moving simultaneously towards the water inlet, the water inlet connector and the water outlet connector are simultaneously in a closed state, and the braided flexible pipe is caused to be leak-proof.

In some embodiments, the first connecting pipe is fixed to an inner wall of the water inlet connector via a support member, and the second connecting pipe is fixed to an inner wall of the water outlet connector via another support member.

The beneficial effects of the present disclosure are:

1. When the faucet or valve connected to the water outlet connector is opened, the water outlet connector is under negative pressure at one end relative to the water inlet connector. This is because the water inlet connector is connected to the water pipe and there is water pressure. The elastic amounts of the first elastic member and the second elastic member are set according to the actual water pressure, and the first elastic member and the second elastic member can be compressed under the action of water pressure, such that the first stopper and the second stopper move simultaneously in the direction of the water outlet, thereby allowing the water to flow smoothly through the braided flexible pipe and out. When the faucet or valve connected to the water outlet connector is closed, the pressure inside the braided flexible pipe is uniform due to the closure of the water outlet connector, and the first elastic member and the second elastic member return from the compressed state to a natural state, which in turn pushes the first stopper and the second stopper to move simultaneously in the direction of the water inlet, such that the water inlet connector and the water outlet connector are simultaneously in a closed state.

2. The synchronous movement of the first stopper and the second stopper can be achieved by the liquid pressure of the pressure transmission pipe, thereby accurately controlling the water flow capacity of the braided flexible pipe.

REFERENCE NUMERALS

100, braided flexible pipe;
200, water inlet connector;
210, water inlet adjustment assembly; 211, first stopper; 212, first piston; 213, first connecting pipe; 214, first elastic member;
220, first sealing-limiting ring body;
300, water outlet connector; 310, water outlet adjustment assembly; 311, second stopper; 312, second piston; 313, second connecting pipe; 314, second elastic member;
320, second sealing-limiting ring body;
330, limiting ring body;
400, pressure transmission pipe;
500, support member.

DETAILED DESCRIPTION

The technical solution of the embodiments of the present disclosure will be described in a clear manner below in conjunction with the drawings in the embodiments of the present disclosure. Obviously, the embodiments described are some embodiments but not all of the embodiments of the present disclosure. All other embodiments obtained by those skilled in the art based on the embodiments of the present disclosure fall within the scope of the present disclosure.

Figure 1:
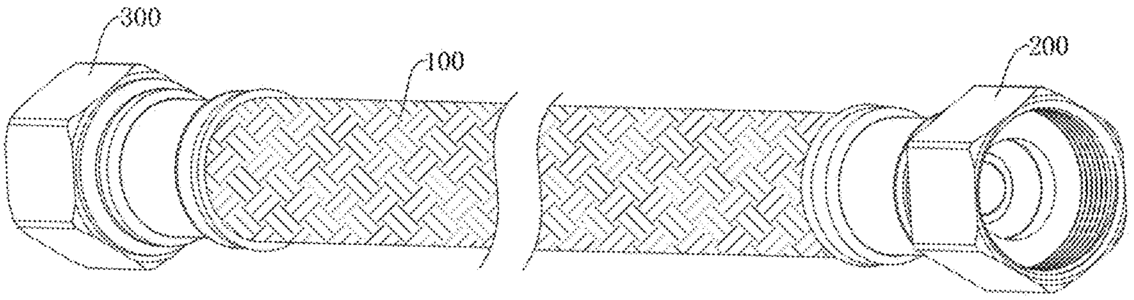
FIG. 1 is a schematic view of an overall structure according to some embodiments of the present disclosure.

Referring to FIG. 1, the first embodiment of the present disclosure provides a braided flexible pipe assembly, including a braided flexible pipe 100, a water inlet connector 200 connected to an end of the braided flexible pipe 100, and a water outlet connector 300 connected to another end of the braided flexible pipe 100, where the water inlet connector 200 is connected to a water inlet pipe, and the water outlet connector 300 is connected to a faucet or valve.

In particular, a water inlet adjustment assembly 210 is arranged in the water inlet connector 200, and a water outlet adjustment assembly 310 is arranged in the water outlet connector 300; a pressure transmission pipe 400 is connected between the water inlet adjustment assembly 210 and the water outlet adjustment assembly 310, and the pressure transmission pipe 400 is arranged in the braided flexible pipe 100.

Since the water outlet connector 300 is connected to the faucet or valve, in cases where an outlet of the braided flexible pipe 100 is in a closed state, in order to prevent leakage of the braided flexible pipe 100 at the outlet due to aging, rupture, and other reasons, when the water outlet connector 300 is in a closed state, the water outlet adjustment assembly 310 seals the water inlet adjustment assembly 210 via the pressure transmission pipe 400, such that the water inlet connector 200 is closed, thereby achieving a seal at the water inlet connector 200, and no more water can enter the braided flexible pipe and no water can leak.

Figure 2:
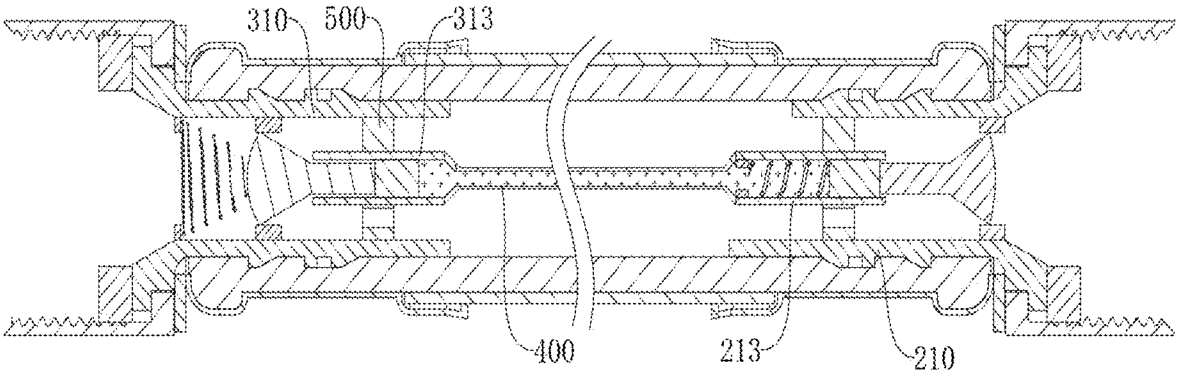
FIG. 2 is a cross-sectional schematic view of an overall structure according to some embodiments of the present disclosure.
Figure 3:
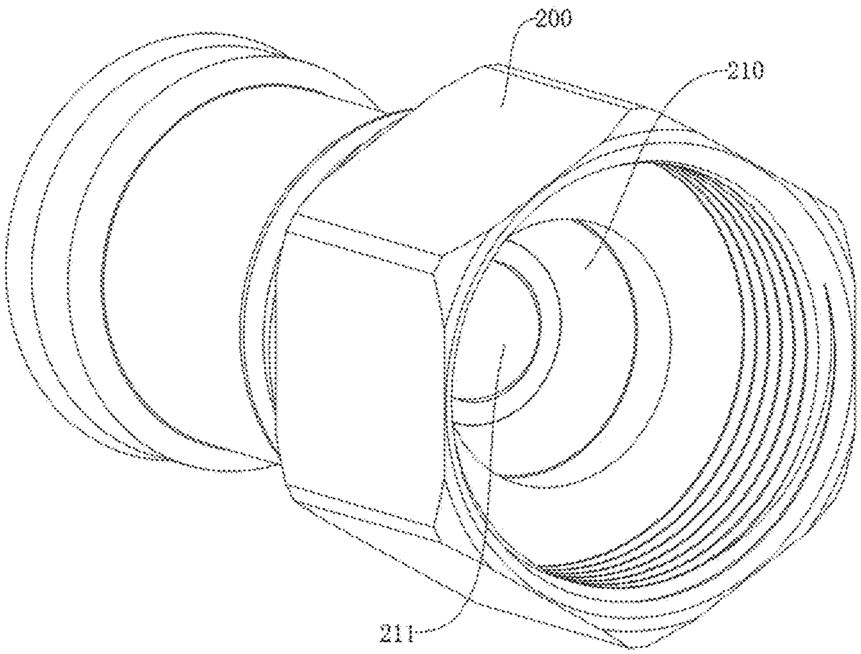
FIG. 3 is a schematic view of a water inlet connector according to some embodiments of the present disclosure.

For a more detailed implementation of the above technical solutions, referring to FIGS. 2 and 3, the water inlet adjustment assembly 210 includes a first stopper 211, and a first piston 212 is connected to an end of the first stopper 211 towards inside the braided flexible pipe 100, where the first piston 212 is sealed and slidably connected within a first connecting pipe 213.

Figure 4:
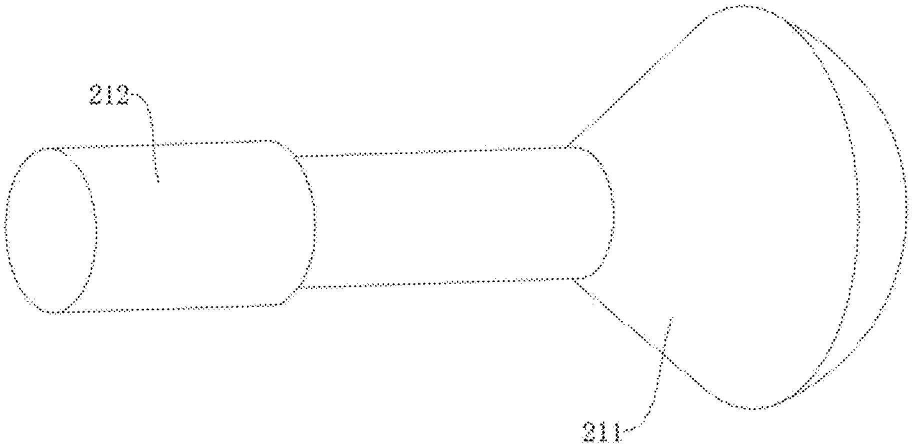
FIG. 4 is a structural schematic view of a first stopper according to some embodiments of the present disclosure.
Figure 5:
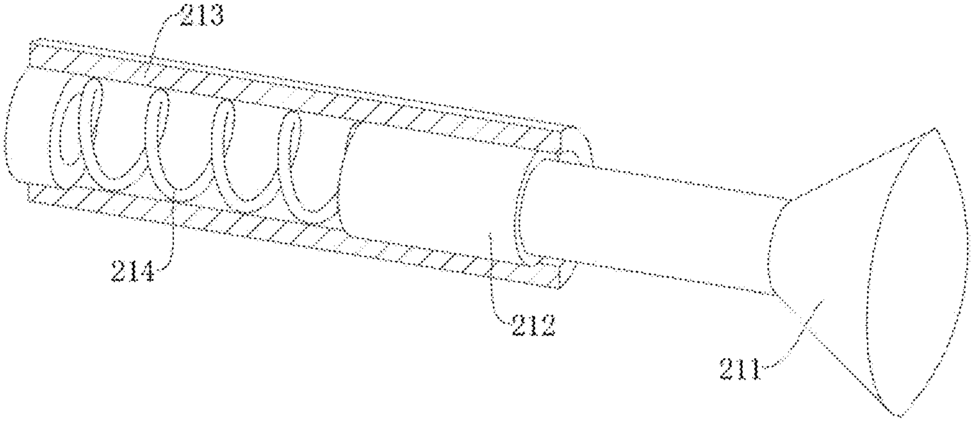
FIG. 5 is a cross-sectional schematic view of a first connecting pipe according to some embodiments of the present disclosure.

Referring to FIGS. 2 and 4, the water outlet adjustment assembly 310 includes a second stopper 311, and a second piston 312 is connected to an end of the second stopper 311 towards outside the braided flexible pipe 100, where the second piston 312 is sealed and slidably connected within a second connecting pipe 313.

Figure 6:
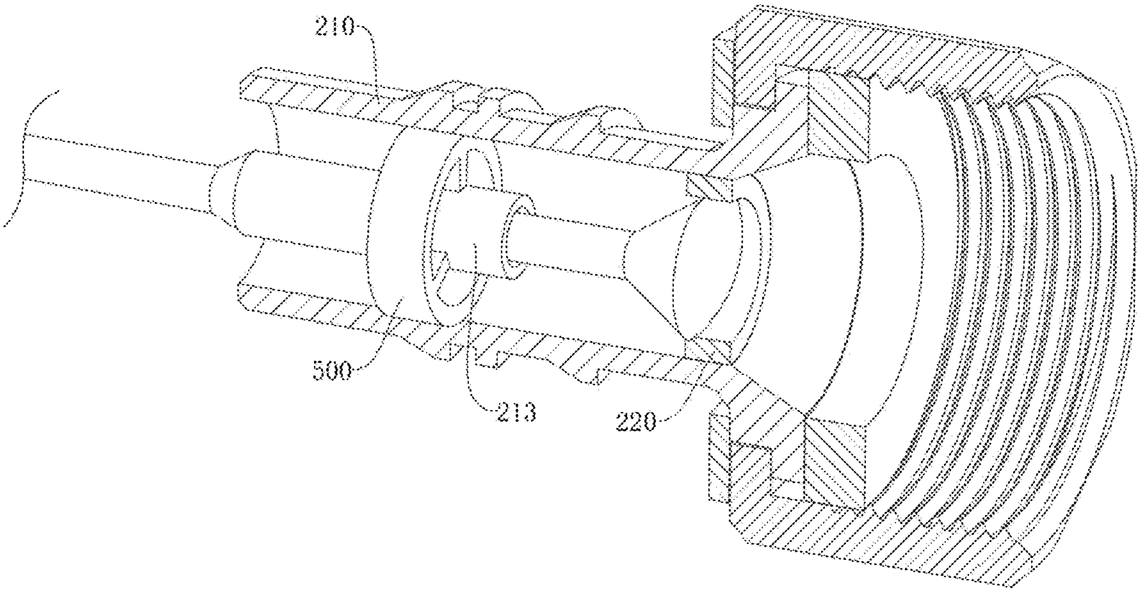
FIG. 6 is a cross-sectional schematic view of a water inlet adjustment assembly according to some embodiments of the present disclosure.

Referring to FIGS. 2 and 6, a first sealing-limiting ring body 220 is fixedly arranged on an inner side of the water inlet connector 200, and the first sealing-limiting ring body 220 is configured to limit the first stopper 211 in a direction towards the water inlet connector 200 outward. When the first stopper 211 completely abuts against the first sealing-limiting ring body 220, the closed state of the water inlet connector 200 is achieved.

Figure 7:
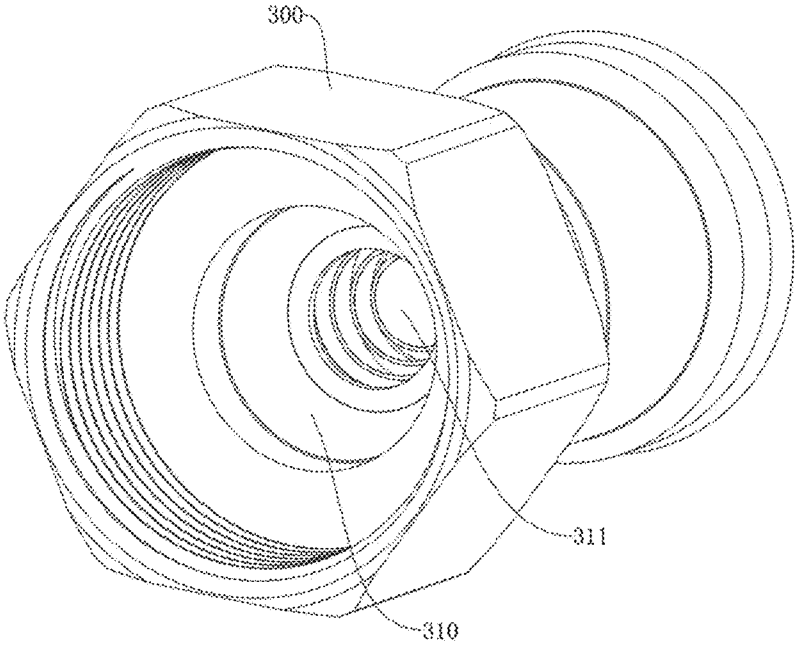
FIG. 7 is a schematic view of a water outlet connector according to some embodiments of the present disclosure.
Figure 8:
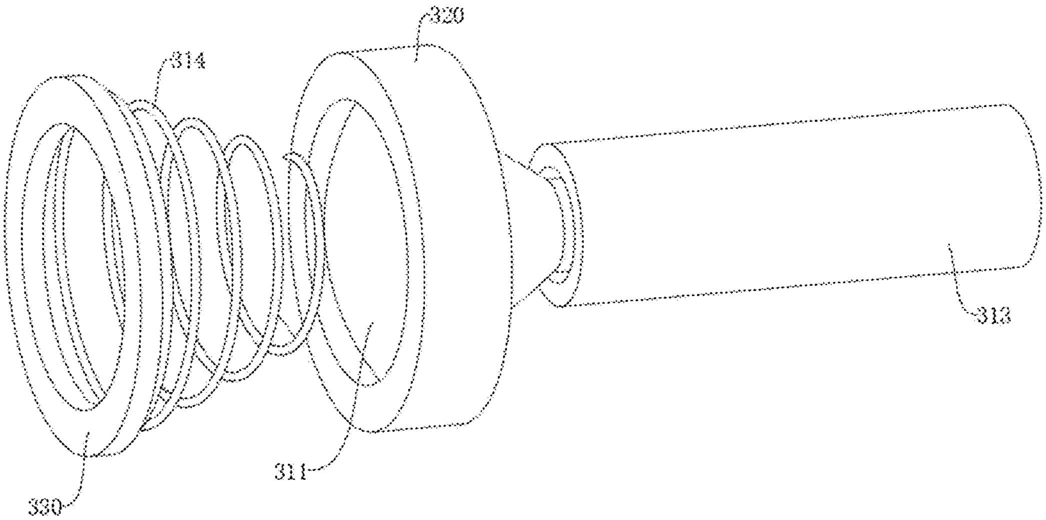
FIG. 8 is a structural schematic view of a second elastic member according to some embodiments of the present disclosure.
Figure 9:
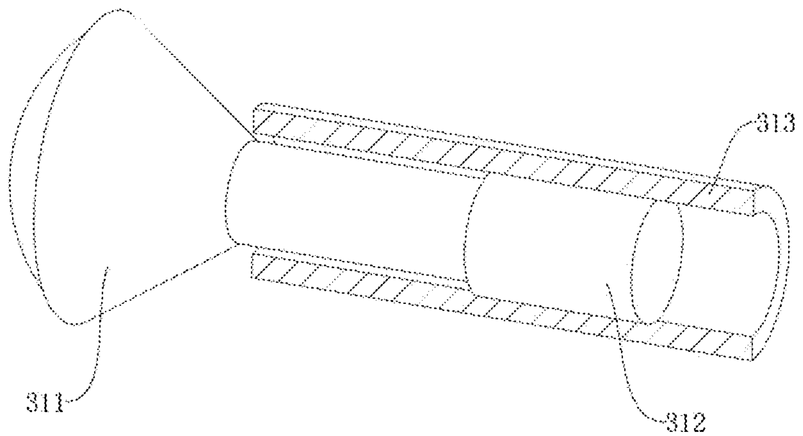
FIG. 9 is a cross-sectional schematic view of a second connecting pipe according to some embodiments of the present disclosure.
Figure 10:
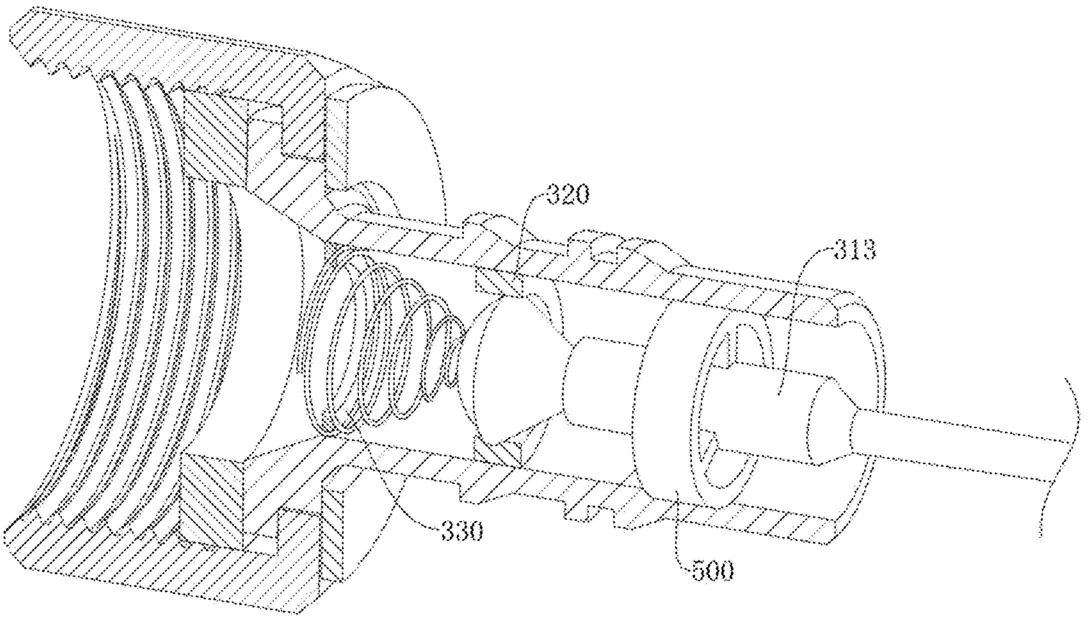
FIG. 10 is a cross-sectional schematic view of a water outlet adjustment assembly according to some embodiments of the present disclosure.

Referring to FIGS. 2 and 7, a second sealing-limiting ring body 320 is fixedly arranged on an inner side of the water outlet connector 300, and the second sealing-limiting ring body 320 is configured to limit the second stopper 311 in a direction towards the water outlet connector 300 outward. When the second stopper 311 completely abuts against the second sealing-limiting ring body 320, the closed state of the water outlet connector 300 is achieved.

The first connecting pipe 213 and the second connecting pipe 313 are sealed and connected to both ends of the pressure transmission pipe 400.

Referring to FIGS. 4-10, a first elastic member 214 is arranged in the first connecting pipe 213, where the first elastic member 214 is limited in the first connecting pipe 213, and the first elastic member 214 is in a compressed state and presses against the first piston 212 in a direction towards the first stopper 211.

A limiting ring body 330 is fixedly arranged in the water outlet connector 300, and a second elastic member 314 is connected between the limiting ring body 330 and an end of the second stopper 311 in the direction towards the water outlet.

In the embodiments, when the faucet or valve connected to the water outlet connector 300 is opened, the water outlet connector 300 is under negative pressure at one end relative to the water inlet connector 200. This is because the water inlet connector 200 is connected to the water pipe and there is water pressure. The elastic amounts of the first elastic member 214 and the second elastic member 314 are set according to the actual water pressure, and the first elastic member 214 and the second elastic member 314 can be compressed under the action of water pressure, such that the first stopper 211 and the second stopper 311 move simultaneously in the direction of the water outlet, thereby allowing the water to flow smoothly through the braided flexible pipe 100 and out.

When the faucet or valve connected to the water outlet connector 300 is closed, the pressure inside the braided flexible pipe 100 is uniform due to the closure of the water outlet connector 300, and the first elastic member 214 and the second elastic member 314 return from the compressed state to a natural state, which in turn pushes the first stopper 211 and the second stopper 311 to move simultaneously in the direction of the water inlet, such that the water inlet connector 200 and the water outlet connector 300 are simultaneously in a closed state.

Referring to FIG. 2, it can be seen that after the first stopper 211 blocks the water inlet connector 200 and the second stopper 311 blocks the water outlet connector 300, the area between the inside of the braided flexible pipe 100 and the pressure transmission pipe 400 forms a separate enclosed space, while the area between the water outlet connector 300, the pressure transmission pipe 400, and the water inlet connector 200 is in communication by means of the first piston 212 and the second piston 312.

In this way, even if the braided flexible pipe 100 ruptures, as long as the valve connected to the water outlet connector 300 is closed, it is impossible for the second piston 312 to move, thereby keeping the water inlet connector 200 closed at all times, thereby preventing water leakage after the braided flexible pipe 100 ruptures.

Based on the characteristics of the movement of the first stopper 211 and the second stopper 311 in the above embodiments, it is clear that synchronization is required. Generally, hydraulics can avoid spatial compression, such as the pneumatic method, which causes asynchronous movement. For this reason, in other embodiments of the present disclosure, the pressure transmission pipe 400 is filled with a liquid, which is configured to synchronize the movement of the second piston 312 towards the water outlet through liquid pressure when the first piston 212 moves towards the water outlet; or, to synchronize the movement of the first piston 212 towards the water inlet through liquid pressure when the second piston 312 moves towards the water inlet.

In particular, when the first stopper 211 and the second stopper 311 move simultaneously in the direction of the water outlet, the water inlet connector 200 and the water outlet connector 300 are in an open state and water flow is allowed.

Conversely, when the first stopper 211 and the second stopper 311 move simultaneously towards the water inlet, the water inlet connector 200 and the water outlet connector 300 are simultaneously in a closed state, such that the braided flexible pipe 100 is leak-proof.

The first connecting pipe 213 and the second connecting pipe 313 are fixed to the inner wall of the water inlet connector 200 and the water outlet connector 300 respectively via a corresponding support member 500.

In the present embodiment, the synchronous movement of the first stopper 211 and the second stopper 311 can be achieved by the liquid pressure of the pressure transmission pipe 400, thereby accurately controlling the water flow capacity of the braided flexible pipe 100.

The above is only specific embodiments of the present disclosure, but the scope of the present disclosure is not limited thereto. Those skilled in the art may make equivalent substitutions or changes based on the technical solutions and inventive concept of the present disclosure within the scope of the technology disclosed by the present disclosure, which shall be covered by the scope of the present disclosure.

What is claimed is:

1. A braided flexible pipe assembly, comprising a braided flexible pipe (100), a water inlet connector (200) connected to an end of the braided flexible pipe (100), and a water outlet connector (300) connected to another end of the braided flexible pipe (100); wherein a water inlet adjustment assembly (210) is arranged in the water inlet connector (200), and a water outlet adjustment assembly (310) is arranged in the water outlet connector (300); a pressure transmission pipe (400) is connected between the water inlet adjustment assembly (210) and the water outlet adjustment assembly (310), and the pressure transmission pipe (400) is arranged in the braided flexible pipe (100); in condition of the water outlet connector (300) being in a closed state, the water outlet adjustment assembly (310) seals the water inlet adjustment assembly (210) via the pressure transmission pipe (400), and the water inlet connector (200) is caused to be in a closed state;

wherein the water inlet adjustment assembly (210) comprises a first stopper (211), and a first piston (212) is connected to an end of the first stopper (211) towards an axial center of the braided flexible pipe (100); the first piston (212) is sealed and slidably connected within a first connecting pipe (213).

2. The braided flexible pipe assembly according to claim 1, wherein the water outlet adjustment assembly (310) includes a second stopper (311), and a second piston (312) is connected to an end of the second stopper (311) towards the axial center of the braided flexible pipe (100); the second piston (312) is sealed and slidably connected within a second connecting pipe (313).

3. The braided flexible pipe assembly according to claim 2, wherein a first sealing- limiting ring body (220) is fixedly arranged on an inner side of the water inlet connector (200), and the first sealing-limiting ring body (220) is configured to limit the first stopper (211) in a direction towards the water inlet connector (200) outward; in condition of the first stopper (211) completely abutting against the first sealing-limiting ring body (220), the closed state of the water inlet connector (200) is achieved.

4. The braided flexible pipe assembly according to claim 3, wherein a second sealing-limiting ring body (320) is fixedly arranged on an inner side of the water outlet connector (300), and the second sealing-limiting ring body (320) is configured to limit the second stopper (311) in a direction towards the water outlet connector (300) outward;

in condition of the second stopper (311) completely abutting against the second sealing-limiting ring body (320), the closed state of the water outlet connector (300) is achieved.

5. The braided flexible pipe assembly according to claim 4, wherein the first connecting pipe (213) is sealed and connected to an end of the pressure transmission pipe (400), and the second connecting pipe (313) is sealed and connected to another end of the pressure transmission pipe (400).

6. The braided flexible pipe assembly according to claim 5, wherein a first elastic member (214) is arranged in the first connecting pipe (213); the first elastic member (214) is limited in the first connecting pipe (213), and the first elastic member (214) is in a compressed state and presses against the first piston (212) in a direction towards the first stopper (211).

7. The braided flexible pipe assembly according to claim 6, wherein a limiting ring body (330) is fixedly arranged in the water outlet connector (300), and a second elastic member (314) is connected between the limiting ring body (330) and an end of the second stopper (311) in the direction towards a water outlet.

8. The braided flexible pipe assembly according to claim 7, wherein the pressure transmission pipe (400) is filled with a liquid; the liquid is configured to synchronize a movement of the second piston (312) towards the water outlet through liquid pressure in condition of the first piston (212) moving towards the water outlet; or, the liquid is configured to synchronize a movement of the first piston (212) towards a water inlet through liquid pressure in condition of the second piston (312) moving towards the water inlet.

9. The braided flexible pipe assembly according to claim 8, wherein in condition of the first stopper (211) and the second stopper (311) moving simultaneously towards the water outlet, the water inlet connector (200) and the water outlet connector (300) are in an open state and water flow is allowed;

in condition of the first stopper (211) and the second stopper (311) moving simultaneously towards the water inlet, the water inlet connector (200) and the water outlet connector (300) are simultaneously in a closed state, and the braided flexible pipe (100) is caused to be leak-proof.

10. The braided flexible pipe assembly according to claim 5, wherein the first connecting pipe (213) is fixed to an inner wall of the water inlet connector (200) via a support member (500), and the second connecting pipe (313) is fixed to an inner wall of the water outlet connector (300) via another support member (500).

* * * * *